(12) United States Patent
Cox

(10) Patent No.: US 6,874,849 B1
(45) Date of Patent: Apr. 5, 2005

(54) SADDLES FOR PEDAL-OPERATED MACHINES

(76) Inventor: Brian Anthony Cox, The White House, Yarmouth Road, North Walsham, Norfolk (GB), NR28 9AT ( * ) Notice: Subject to any disclaimer, the term of this patent is extended or adjusted under 35 U.S.C. 154(b) by 0 days.

(21) Appl. No.: 09/914,828

(22) PCT Filed: Mar. 3, 2000

(86) PCT No.: PCT/GB00/00774
§ 371 (c)(1),
(2), (4) Date: Aug. 31, 2001

(87) PCT Pub. No.: WO00/51877
PCT Pub. Date: Sep. 8, 2000

(30) Foreign Application Priority Data

Mar. 3, 1999 (GB) .............................. 9904728

(51) Int. Cl.[7] ................................................ B60N 2/38
(52) U.S. Cl. ..................... 297/195.1; 297/214
(58) Field of Search ................ 297/195.1, 195.11, 297/215.13, 215.14, 215.15, 311, 312, 314, 313, 318, 317, 196, 201

(56) References Cited

U.S. PATENT DOCUMENTS

| 468,398 | A | * | 2/1892 | Sherman |
| 560,228 | A | * | 5/1896 | Nelson |
| 569,981 | A | * | 10/1896 | Strakosch |
| 593,331 | A | * | 11/1897 | Noirit |
| 603,943 | A | * | 5/1898 | Clifford |
| 632,564 | A | * | 9/1899 | Gulden |
| 656,854 | A | * | 8/1900 | Nord |
| 4,004,763 | A | * | 1/1977 | Bunnell, III et al. |
| 4,108,462 | A | * | 8/1978 | Martin |
| 4,369,998 | A | * | 1/1983 | Blase ...................... 297/195.1 |
| 4,387,925 | A | * | 6/1983 | Barker et al. ................ 297/201 |
| 4,541,668 | A | * | 9/1985 | Rouw .......................... 297/201 |
| 4,662,677 | A | * | 5/1987 | Hughes |
| 4,773,705 | A | * | 9/1988 | Terranova |
| 5,603,551 | A | * | 2/1997 | Sheehan |
| 5,605,372 | A | * | 2/1997 | Al-Abdullateef |
| 5,749,622 | A | * | 5/1998 | Tseng |
| 5,769,492 | A | * | 6/1998 | Jensen |
| 6,019,422 | A | * | 2/2000 | Taormino et al. ......... 297/195.1 |
| 6,056,356 | A | * | 5/2000 | Unger, Jr. .................... 297/201 |

* cited by examiner

Primary Examiner—Peter M. Cuomo
Assistant Examiner—Stephen Vu
(74) Attorney, Agent, or Firm—Renner, Kenner, Greive, Bobak, Taylor & Weber

(57) ABSTRACT

A saddle for a bicycle, tricycle, exercise cycle or the like has a mounting arrangement which permits the saddle to rock from side to side as a rider pedals the cycle. The rocking motion has an effective centre above the surface of the saddle and the saddle is resiliently biased so as to return to its central position when the cycle is not being ridden.

16 Claims, 9 Drawing Sheets

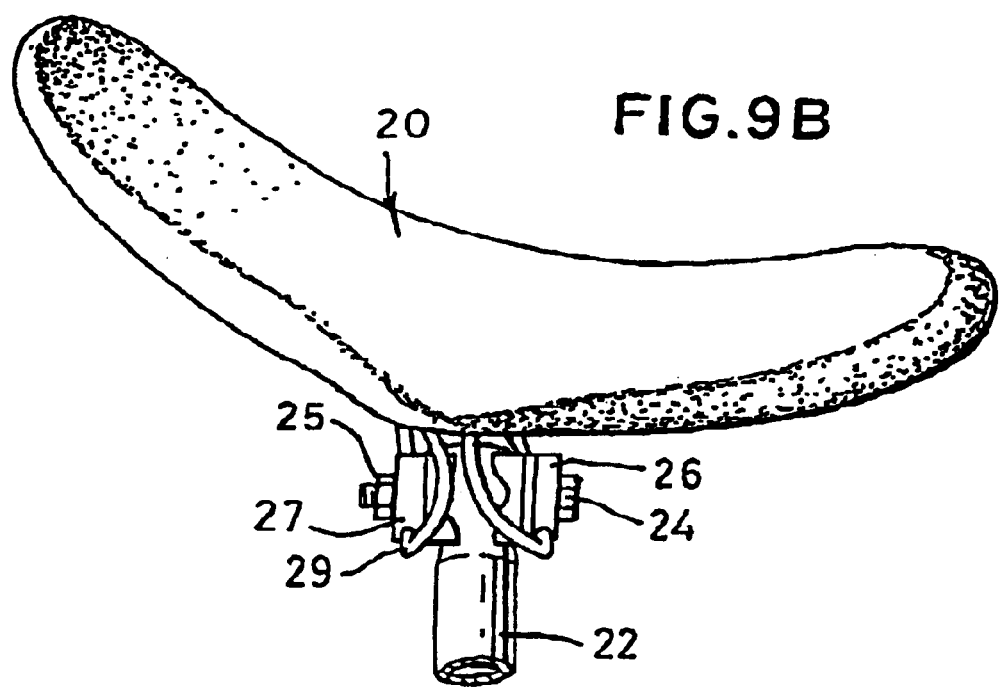
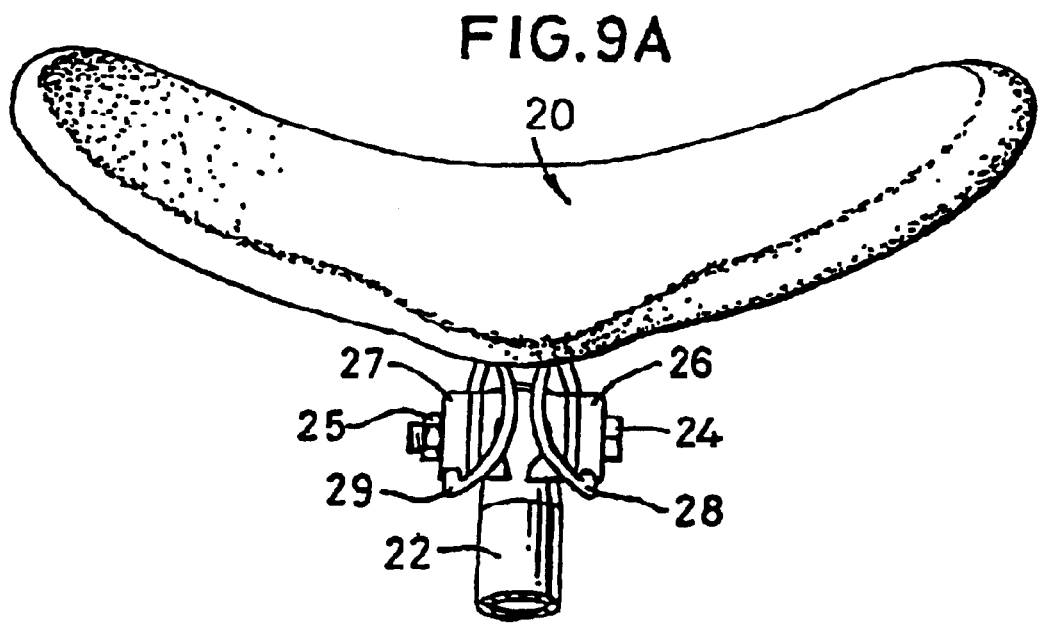

US 6,874,849 B1

SADDLES FOR PEDAL-OPERATED MACHINES

BACKGROUND OF THE INVENTION

(I) Field of the Invention

This invention relates to a saddle for a pedal-operated machine, and in particular—but not exclusively—to a saddle for a bicycle, tricycle, exercise bicycle or the like.

The saddle of this invention is primarily intended for use with a bicycle, which will hereinafter be referred to simply as a "cycle". Though the invention will hereinafter be described exclusively with reference to cycles, it is to be understood that the saddle is suitable for use on a wide variety of pedal-operated machines including those mentioned above and the term "cycle" is not to be understood as limiting the invention to bicycles.

(II) Description of the Related Art

The function of a cycle saddle is to support the greater part of the rider's weight and at the same time to restrain the rider's seat slipping off the saddle while leaving his or her legs free to rotate the pedals. A conventional cycle saddle has a rearward, relatively broad platform on which the inner part of the buttocks of a rider may rest, the platform merging into a single forwardly-projecting relatively narrow saddle horn. The primary function of the horn is to prevent the rider slipping off the saddle but in practice much of the rider's weight may be carried by the horn. Unfortunately, a rider may suffer physical problems or other medical consequences from prolonged or excessive cycling on a conventional saddle of this kind, due to the pressure exerted by the horn on the rider's crotch.

There have been proposals for hornless saddles for cycles, which aim at minimising the likelihood of problems which may arise consequent upon extensive use of a horned saddle. There have moreover been proposals for saddles which may move, or have relatively moveable parts, aimed at making the riding of a cycle more comfortable, or less tiring. However, all of these saddles suffer from various disadvantages including quite often a feeling of insecurity for the rider.

It is a principal aim of the present invention to provide a cycle saddle which is able to support the buttocks of a rider in a particularly comfortable and effective manner, and which does not restrict the free movement of the legs to rotate the pedals of the cycle.

BRIEF SUMMARY OF THE INVENTION

According to the present invention, there is provided a saddle for a pedal-operated machine, which saddle has a seat portion having an upper surface for supporting the buttocks of a user and a mounting arrangement for the seat portion. The mounting arrangement permits the seat portion to perform a lateral rocking motion about an effective axis which is disposed above the upper surface of the seat portion.

When a rider is pedalling a cycle, his hips perform a kind of rolling action with the pelvis rocking from side to side. The saddle of the present invention allows that pelvic action to occur in a natural and unrestricted way, assisting the application of the maximum driving force to the down-going pedal of the cycle. This is because the saddle may rock in such a way that the side of the saddle on the same side of the cycle as the down-going pedal moves downwardly with respect to the other side of the saddle, so not restricting the movement of the leg on the down-going pedal. The opposite side of the saddle rises slightly so better accommodating the weight of the rider on that buttock on that side of the saddle. Then, as the pedals rotate and the other pedal starts its down-going travel, the saddle may rock in the other sense, so freeing for easy movement the leg driving that other pedal.

BRIEF DESCRIPTION OF THE DRAWINGS

In the following, and by way of example only, two specific embodiments of saddle of this invention will be described in detail, referring as required to the accompanying drawings. In those drawings:

FIGS. 9A and 9B show the saddle of FIGS. 4 to 8 respectively in a central position and moved laterally, to undertake a rocking action.

DETAILED DESCRIPTION OF THE INVENTION

Figure 1:
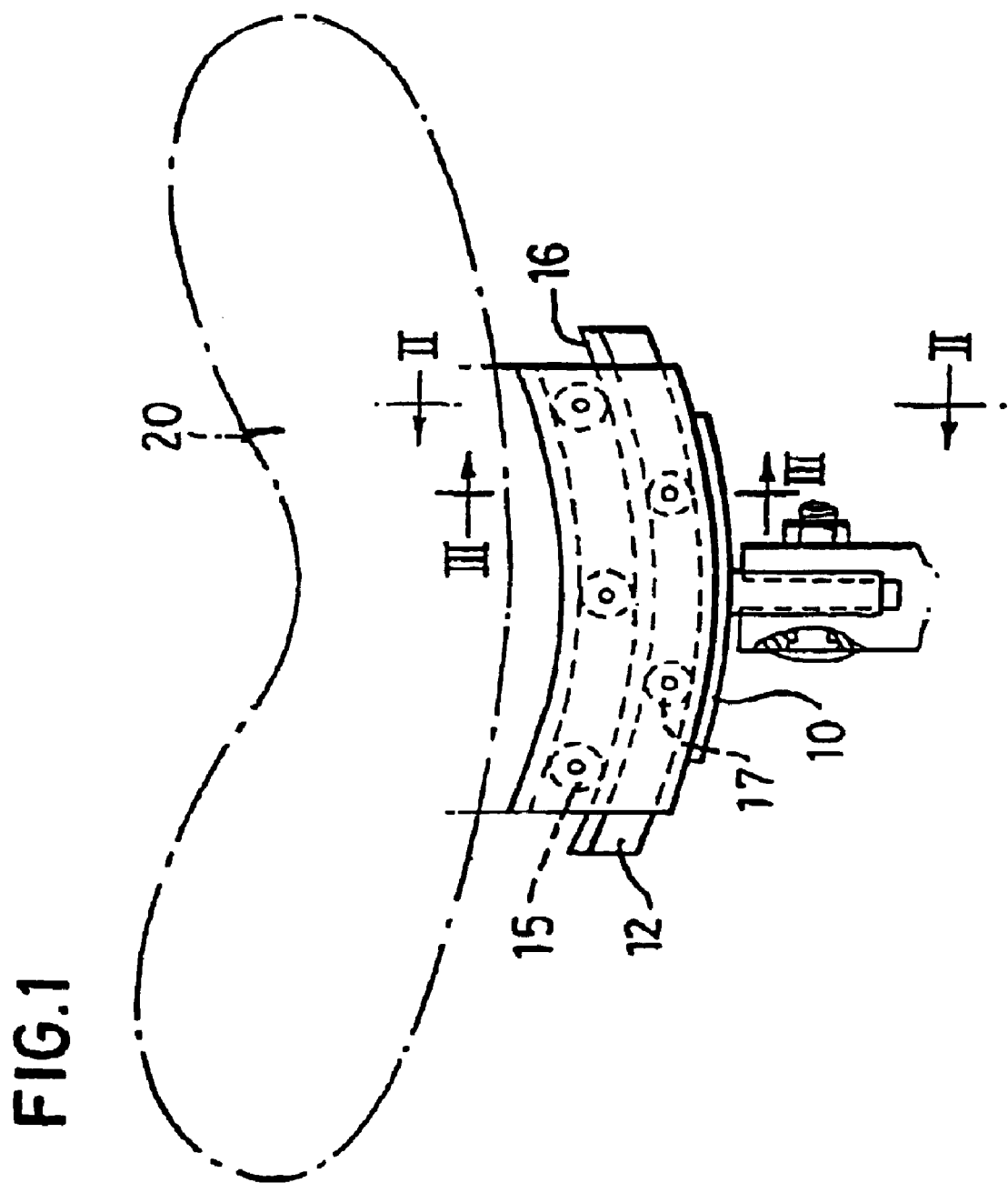
FIG. 1 is an end view on the important parts of the first embodiment of saddle.

In one embodiment of this invention, the saddle is mounted for movement laterally of a cycle and when performing that lateral movement, the saddle simultaneously undergoes a rotational motion about a centre of curvature above the upper surface of the saddle. In an alternative embodiment, the saddle is supported in such a way that it performs a pivoting action having a centre of curvature above the upper surface of the saddle. In this case, though the saddle may move laterally to a small extent, the primary motion is one of pivoting about the centre of curvature above the upper surface.

Though the rocking motion has been described as having an effective axis above the upper surface of the saddle, the rocking motion could be a complex rocking motion and not a simple part-circular motion having a fixed centre of curvature. Thus, the effective centre of curvature for the rocking motion when of a complex form may itself be a locus, of arcuate shape.

The mounting arrangement advantageously includes a mounting means such as a bracket to permit the attachment of the saddle to a cycle—which typically might be a bicycle or tricycle. Such a mounting means may be essentially conventional and so comprise a clamp adapted for tightening around a pillar generally-upwardly extending from a cycle frame.

In the first-mentioned embodiment, the mounting arrangement has a track of generally arcuate form and which defines a path of movement for the seat portion of the saddle. Such a track may be in the form of an arc of a circle—that is, having a fixed radius—with the centre of the arc disposed above the upper surface of the saddle and extending essentially along the plane containing the frame of the cycle. Though that axis preferably is substantially horizontal, it may extend at a small angle to the horizontal, in order to give the most effective support for a rider.

The track may be in the form of a rail mounted on the bracket of the mounting means, the seat portion having at least two rollers which run on the rail. Alternatively, the track could be provided on the underside of the seat portion which track runs along suitable rollers provided on the bracket of the mounting means. In either case, the arrangement of the track and rollers allows the saddle to move laterally of the cycle to which it is attached, following the arcuate path defined by the rail and having an effective centre of curvature above the upper surface of the seat portion. In a preferred arrangement, the rail has an upper surface and the rollers run along that upper surface. The rail may be of T-shaped cross-section with at least two further rollers arranged to run on the undersides of the rail, opposed to said at least two rollers, one to each side of the central web of the T-shaped rail. In this way, the seat portion may securely be located by the mounting means so as to be free for motion along the length of the rail but restrained against movement in all other directions.

In the alternative, the track may define a channel-shaped groove and there are at least two rollers which run in the groove. Fully to locate the seat portion, there may be two channel-shaped grooves spaced apart in a direction parallel to the axis of rocking movement of the seat portion, and rollers which run in each of the grooves. For such an arrangement, it is preferred for the openings to the two grooves to face each other so as to minimise the likelihood of the ingress of foreign matter, the trapping of fingers or the like.

The movement of the seat portion may be damped, for example by providing blocks of resiliently compressible material which tend to restrain the seat portion in its central position and movement away therefrom compresses one or another block. An alternative arrangement would be to provide springs suitably arranged between the seat portion and the bracket of the mounting means.

In an alternative embodiment of the mounting arrangement, there are two links each connected at their upper ends to the saddle portion and at their lower ends to the mounting bracket, whereby the rocking motion is defined by the combined action of the two links. Thus, there is defined a kind of four-bar linkage with the links forming two opposed sides of that linkage and which permits the saddle to perform a pivoting action though with some lateral translation. The links may be resiliently deformable, the lower ends thereof then being clamped to the mounting bracket, whereby the links are resiliently deformed along their lengths, to permit the saddle to perform its rocking motion. This has the advantage that the saddle will be centred with respect to a cycle to which it is secured, when the saddle is not in use by a rider.

The radius of curvature of the rocking movement of the seat portion should be selected having regard to the intended use of the machine. For example, in a case of a cycle intended for use by an adult, it is anticipated that the radius of curvature may be of the order of 200 mm. For other intended uses, such as a cycle for a child, a different radius might be appropriate though it is envisaged that the radius of curvature should lie in the range of about 175–250 mm.

This invention extends to a cycle whenever provided with a saddle of this invention as described above.

Figure 2:
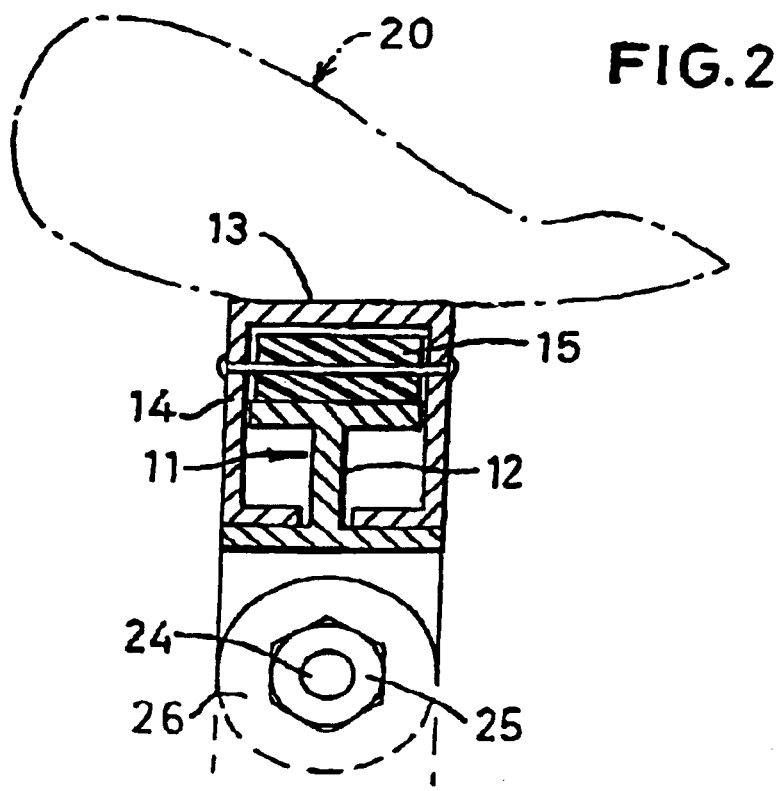
FIGS. 2 and 3 are part-sections taken on lines II—II and III—III marked on FIG. 1.
Figure 3:
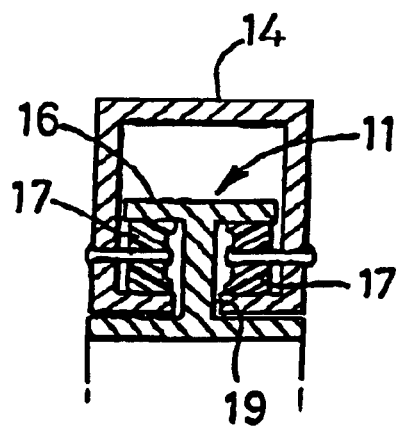
Figure 4:
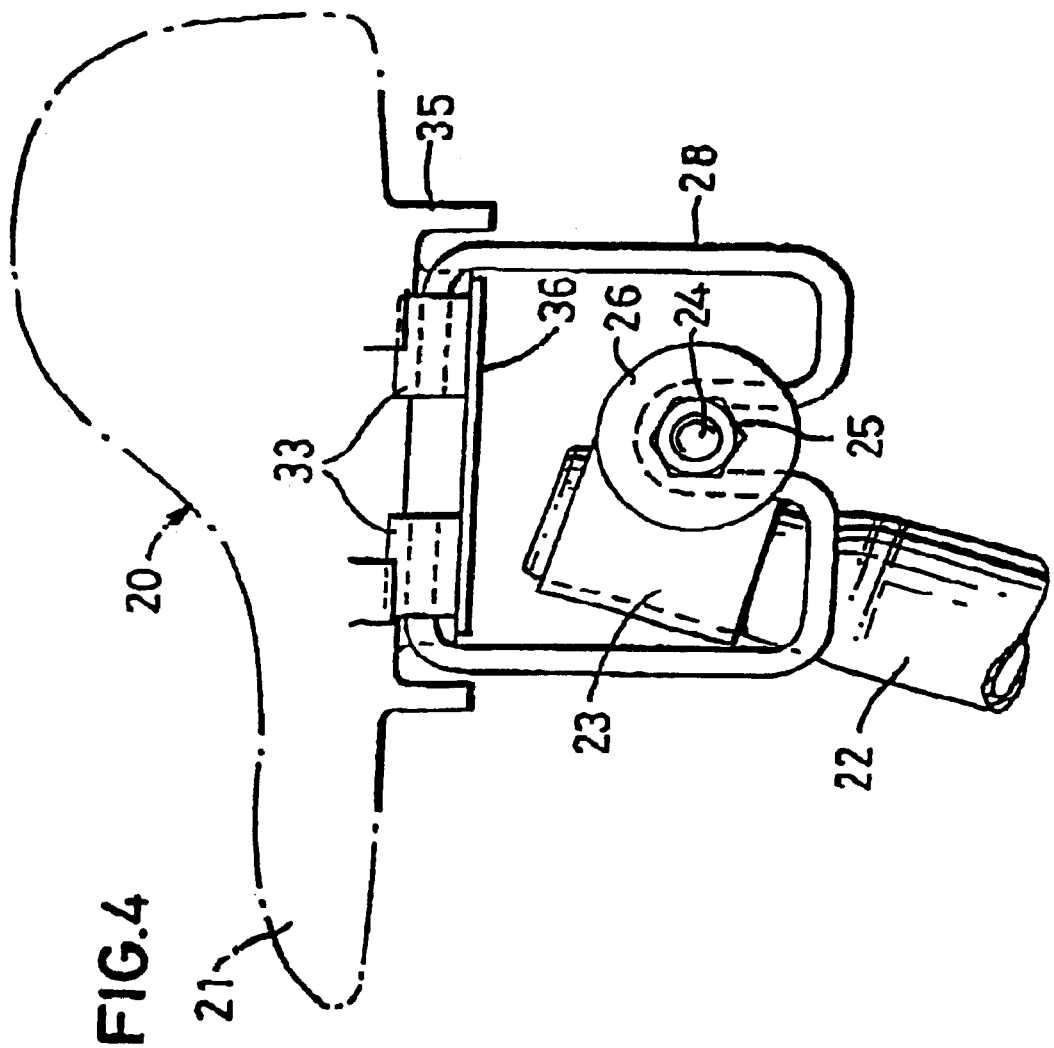
FIG. 4 is a side view on the second embodiment of saddle.

The saddle of this invention includes a mounting bracket 10 furnished with an adjustable clamp shown in FIGS. 1 and 2 and which is adapted for attachment to the upper end of a saddle pillar of a cycle. Such a clamp forms no part of this invention and is well-known in the art; it will not therefore be described in further detail here. The bracket 10 carries a transversely extending rail 11 of T-shaped cross-section, with the web 12 of the rail extending generally vertically. The rail is of arcuate form, as shown in FIG. 1, though the radius of curvature has been exaggerated in that drawing and typically should be approximately 200 mm. The centre of that curvature is thus positioned approximately 200 mm above the centre of the mounting bracket 10.

The saddle has a seat portion which is shown only in outline in the drawings but which is appropriately configured to support the buttocks of a rider of the cycle. Typically therefore the seat portion may be a padded platform which is secured to the upper surface 13 of a carriage 14 which is supported on the rail 11 so as to be able to run from side to side along the length of the rail. The carriage 14 has three rollers 15 which run on the upper surface 16 of the rail 11 and lower rollers 17 which run along the undersides of the flange 18 of the rail 11.

The carriage 14 is generally of box-shaped cross-section but with a slot 19 in its lower face to accommodate the web 12 of the rail 11. Each roller 15 is supported on a pin extending between the side walls of the carriage and each roller 17 is supported on a cantilevered pin extending inwardly from the respective side wall of the carriage.

In use, the clamp of the mounting bracket 10 is secured to the pillar of a cycle so that the web 12 of the rail extends generally in a vertical plane, transverse to the median plane of a cycle with which the saddle is used. Thus, the axis of the centre of curvature of the rail 11 will extend substantially horizontally, in that median plane of the cycle, so that the carriage 14 may rock from side to side with the rollers 15,17 running on the rail 11. As the carriage 14 is substantially closed, and may further be provided with end caps (not shown) closely to fit around the rail, the ingress of dirt or other foreign matter is minimised, as is the entrapment of fingers (for example) should the saddle move laterally other than when the cycle is being powered by a rider.

The saddle will rock from side to side as pedalling of the cycle is undertaken. The leg driving a down-going pedal will tend to depress that side of the saddle, so causing the saddle to rock to the other side of the cycle median plane and thus better to support the other buttock. Then, as the other pedal reaches top dead centre and becomes the down-going pedal, the saddle will run across the median plane of the cycle and allow the leg driving that pedal freely to move and so impart the maximum force to that pedal. Though not shown in this embodiment, springs may be disposed between the mounting bracket 10 and the carriage 14, so as to urge the carriage generally towards the central position shown in FIG. 1, movement away from that central position being against the action of the spring force.

Referring now to FIGS. 4 to 10, there is shown a second embodiment of saddle of this invention and which has a similar action to that described above, but achieved in a different way. The saddle has a seat portion 20 shown in outline only in FIGS. 4 to 6 but shown in more detail in FIGS. 7 to 9. The seat portion 20 has no significant horn for locating between a user's legs, but nevertheless has a small forwardly projecting portion 21, to assist location of a user on the saddle. To increase comfort, the saddle may be made of a slightly resilient material, or may be covered in such a material, in a manner known in the art.

A mounting arrangement is provided to secure the seat portion 20 to the upper end of a saddle pillar 22, which is of entirely conventional form and normally comprises a part of a cycle on which the saddle is mounted. The mounting arrangement includes a pillar clamp 23 of U-shaped form and again of a generally conventional shape, and through which extends a clamp bolt 24 provided with a nut 25. Also disposed on the bolt 24 are two pairs of clamp washers 26 and 27, respective mounting rods 28 and 29 being clamped between those pairs of washers 27.

Figure 8:
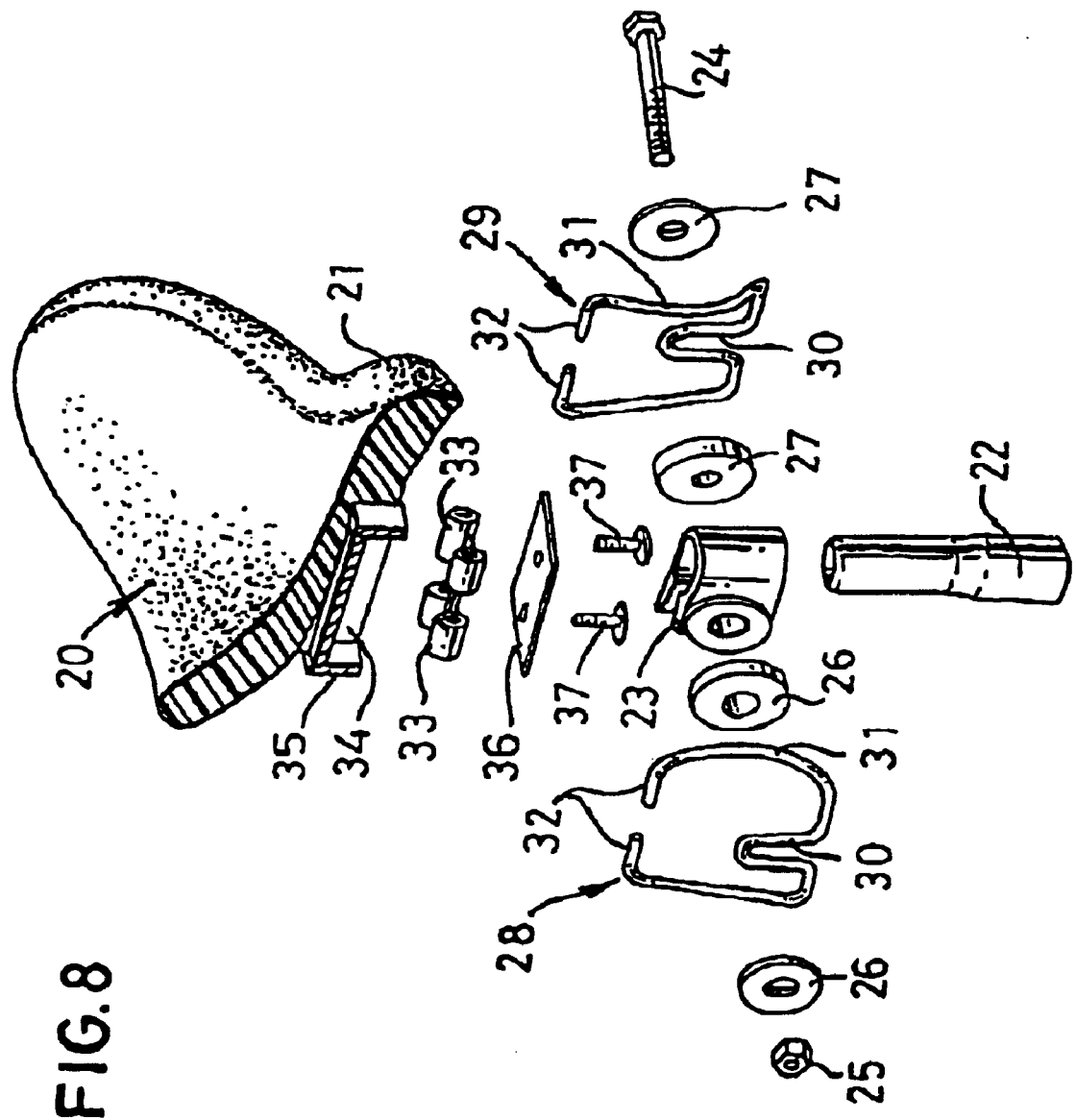
FIG. 8 shows the components of the second embodiment, in an exploded view.
Figure 10:
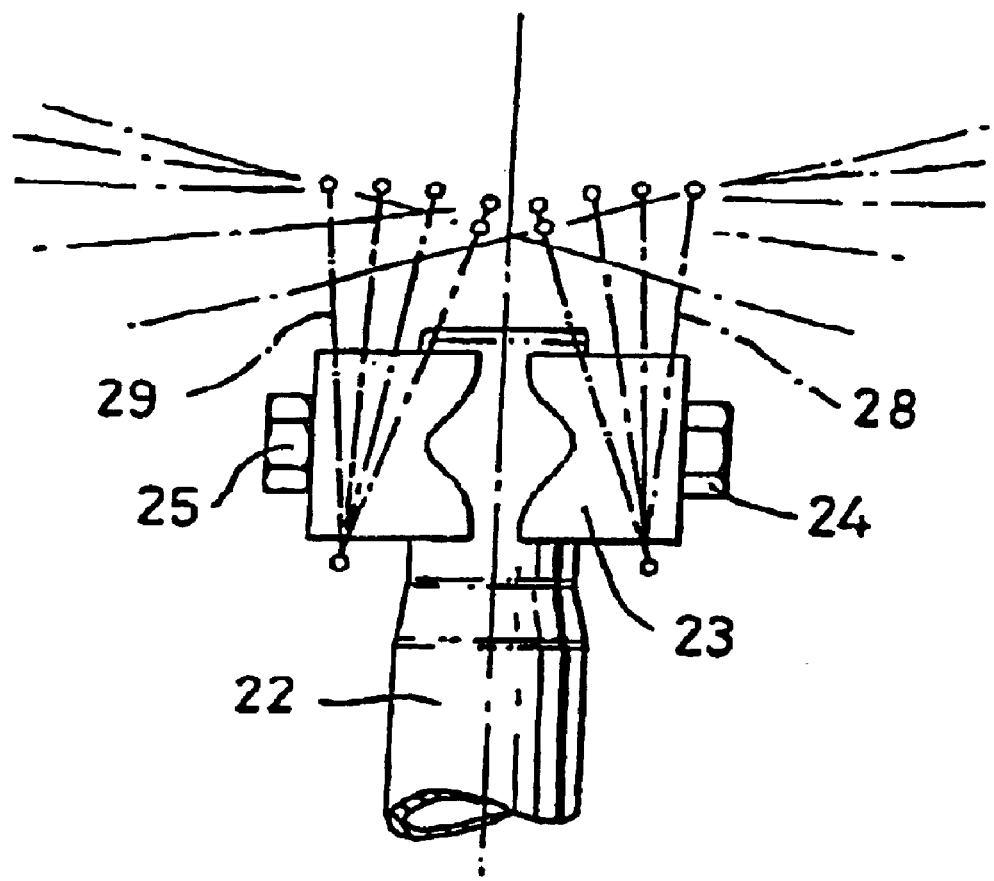
FIG. 10 illustrates the locus of movement of the saddle.

Each mounting rod 28,29 has a U-shaped lower portion 30 in which is received the clamp bolt 24 and upwardly projecting side portions 31 having the end regions 32 turned over to face one another. Though the rearward side portions 31 are essentially linear, the forward side portions are both inwardly curved, towards one another, as best seen in FIGS. 5 and 8.

Disposed on each end region 32 is a respective bush 33, received in a recess 34 provided in a mounting block 35 secured to the underside of the seat portion 20. The bushes 33 are retained in the recess by a plate 36, secured in position by two bolts 37 passing through the plate into threaded holes in the block 35.

Figure 5:
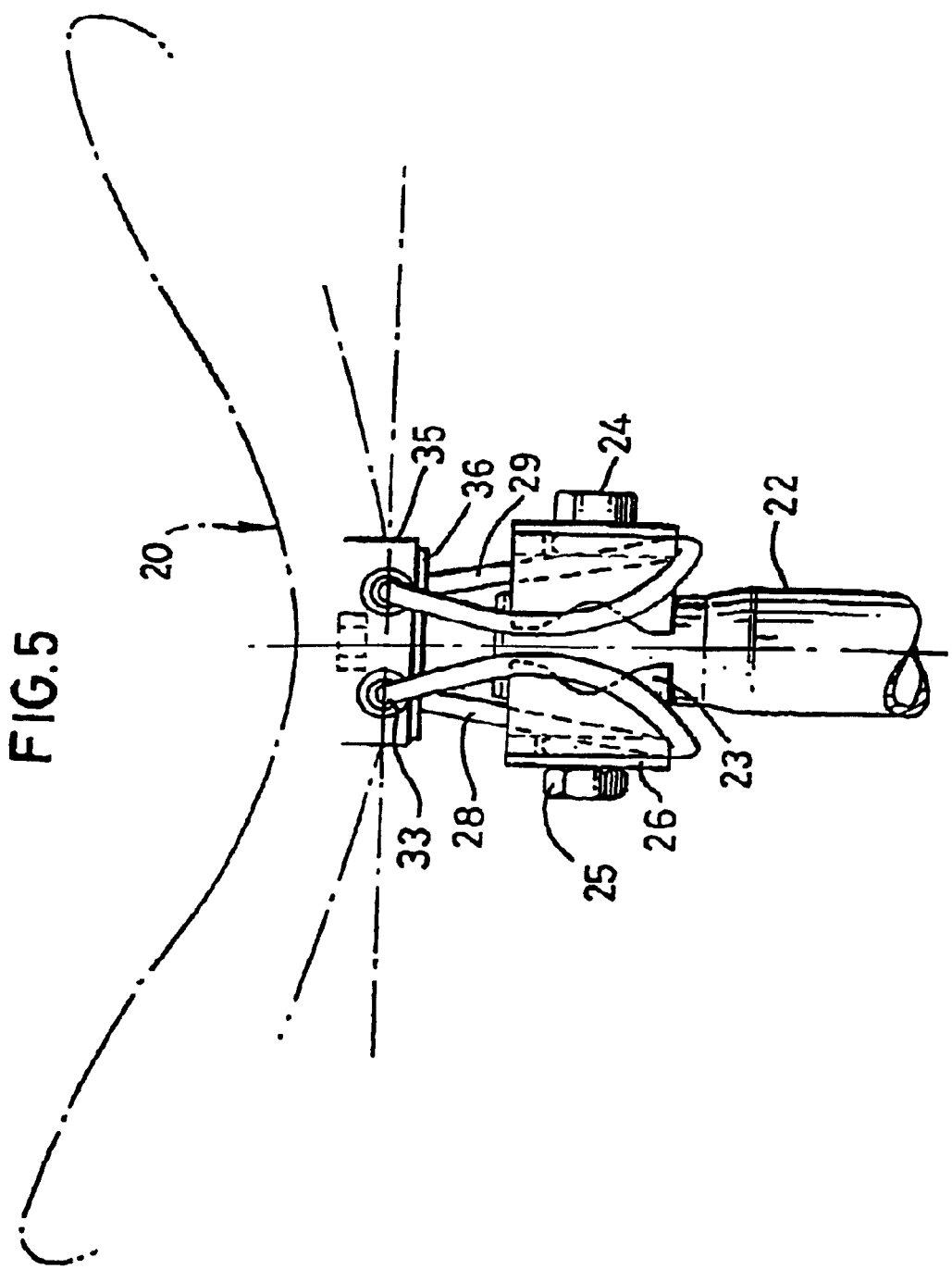
FIG. 5 is an end view on the saddle of FIG. 4.
Figure 6:
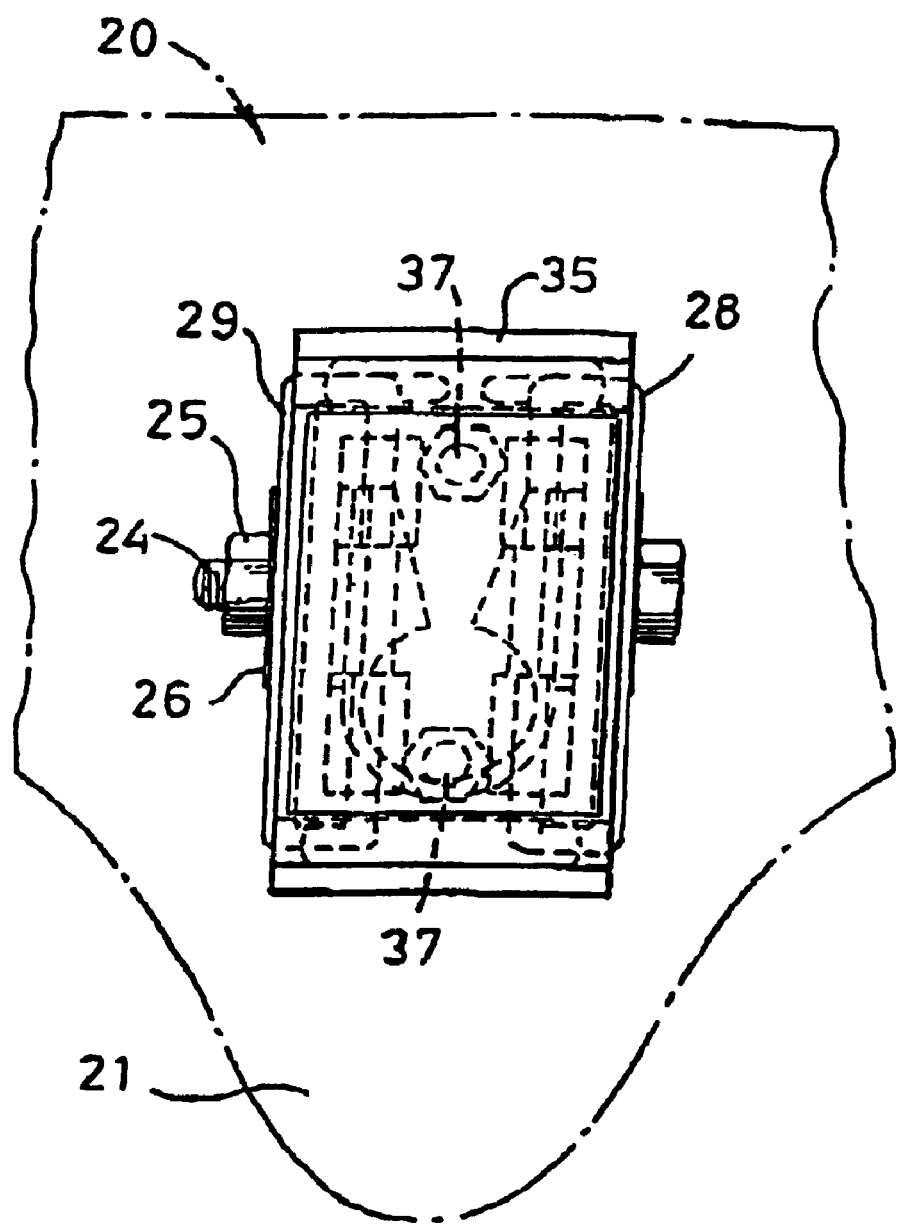
FIG. 6 is a plan view on the mounting arrangement for the second embodiment, but with the saddle removed for clarity and shown in long chain lines.
Figure 7:
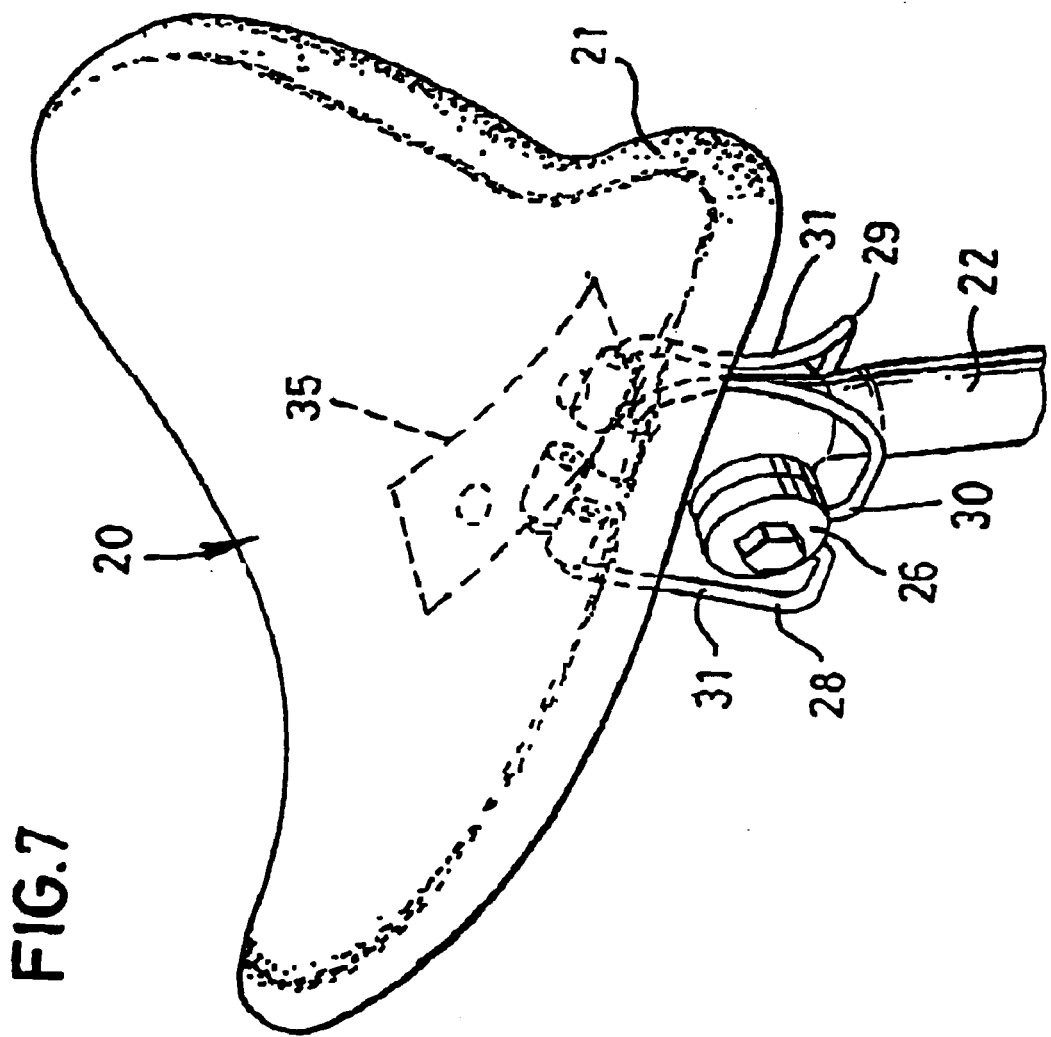
FIG. 7 is a general perspective view of the saddle assembly of FIGS. 4 to 6.

When fully assembled, the above-described mounting arrangement maintains the saddle centrally of the median plane of a cycle, as shown in FIGS. 5 and 9A. On riding a cycle fitted with the saddle, the leg driving the down-going pedal, will tend to depress that side of the saddle, so causing the saddle to rock, as shown in FIG. 9B, relieving pressure from the down-going leg and allowing the pelvis to move. This rocking action is performed by the rods 28 and 29 deforming resiliently to some extent, until an equilibrium position is reached. As the down-going pedal reaches bottom dead centre and the other pedal top dead centre, a rider starts to press down on the other pedal and this allows the saddle to rock in the opposite sense, relieving pressure from the down-going leg. This rocking action is diagrammatically illustrated in FIG. 10, which shows the locus of the end regions 32 of the rods 28 and 29. On a rider dismounting the cycle, the saddle will return to its central position as shown in FIG. 9A.

What is claimed is:

1. A saddle for a pedal-operated machine, said saddle having a seat portion having an upper surface for supporting the buttocks of a user and a mounting arrangement below the seat portion wherein said mounting arrangement permits the seat portion to perform a lateral rocking motion, said lateral rocking motion having an effective axis about which the motion is performed, said effective axis being disposed above the upper surface of the seat portion.

2. The saddle as claimed in claim 1, wherein the effective axis of rocking motion of the seat portion extends substantially horizontally.

3. The saddle as claimed in claim 1, wherein the mounting arrangement includes a mounting bracket to permit the mounting of the saddle on the machine.

4. The saddle as claimed in claim 3, wherein the mounting arrangement includes a track of a generally arcuate form and which defines a curved path along which the seat portion will move when in use.

5. The saddle as claimed in claim 4, wherein the track is of part-circular form, centered on the axis disposed above the upper surface of the seat portion.

6. The saddle as claimed in claim 4, wherein the track is in the form of a rail mounted on one of the seat portion and the bracket, and the other of the seat portion and the bracket has at least two rollers which run on the rail.

7. The saddle as claimed in claim 6, wherein the rail has an upper surface and said at least two rollers run on the rail upper surface.

8. The saddle as claimed in claim 7, wherein the rail is of a T shaped section with a flange projecting laterally from a central web and at least two additional rollers are disposed one on each side of the central web of the rail and arranged to run on the undersides of the flange, in opposition to said at least two rollers.

9. The saddle as claimed in claim 4, wherein the track defines a channel-shaped groove and there are at least two rollers running in the groove.

10. The saddle as claimed in claim 9, wherein two channel-shaped grooves are spaced apart in a direction parallel to the axis of rocking movement of the seat portion, and said rollers running in both of the grooves.

11. The saddle as claimed in claim 4, wherein the bracket is connected to the track and the seat portion is provided with said rollers which run on the track.

12. The saddle as claimed in claim 3, wherein the mounting arrangement includes two links each connected at their upper ends to the seat portion and at their lower ends to the mounting bracket, whereby the rocking motion is defined by the combined action of the links.

13. The saddle as claimed in claim 12, wherein the links are resiliently deformable and said lower ends thereof are clamped to the mounting bracket, whereby the links are resiliently deformed as the saddle performs its rocking motion.

14. The saddle as claimed in claim 1, wherein the seat portion is resiliently biased to a central position and moves against that bias when performing a rocking motion.

15. The saddle as claimed in claim 1, wherein the radius of curvature of the rocking movement of the seat portion lies in the range of 175 to 250 mm.

16. A pedal-operated machine having pedals and a saddle, wherein the saddle has a seat portion having an upper surface for supporting the buttocks of a user and a mounting arrangement below the seat portion, wherein mounting arrangement permits the seat portion to perform a lateral rocking motion, said lateral rocking motion having an effective axis about which the motion is performed, and said effective axis being disposed above the upper surface of the seat portion.

* * * * *